United States Patent [19]

Prevette

[11] Patent Number: 4,478,539
[45] Date of Patent: Oct. 23, 1984

[54] MULTIPLE TOOL HOLDER WITH RETAINER AND DRIVE SOCKET

[76] Inventor: Paul J. Prevette, 3910 Admiral Ave., Charlotte, N.C. 28205

[21] Appl. No.: 212,365

[22] Filed: Dec. 3, 1980

[51] Int. Cl.³ .................... B23F 1/04; B23G 1/30
[52] U.S. Cl. .......................... 408/117; 7/158; 145/63; 408/241 R
[58] Field of Search .................. 408/238, 239, 239 A, 408/240, 241 R, 117; 145/62, 63, 64; 7/158

[56] References Cited

U.S. PATENT DOCUMENTS

| | | | |
|---|---|---|---|
| 648,589 | 5/1900 | Lanfair | 145/63 X |
| 1,074,025 | 9/1913 | Taylor | 408/117 |
| 1,685,087 | 9/1928 | Johnson | 408/117 X |
| 1,816,812 | 8/1931 | Allison | 145/63 |
| 4,111,591 | 9/1978 | Rolnick | 408/117 |
| 4,227,430 | 10/1980 | Jansson et al. | 145/62 X |
| 4,241,773 | 12/1980 | Personnat | 145/63 |

Primary Examiner—Z. R. Bilinsky
Attorney, Agent, or Firm—Richards, Shefte & Pinckney

[57] ABSTRACT

A holder for taps and dies has an elongated holding portion having sockets for holding dies in fixed position for use, elongated recesses for storage of taps therein, a drive socket for reception of taps thereinto for use, a movable retainer secured over the recesses for selectively retaining the taps in the recesses and releasing the taps individually for engagement with the drive socket, and retention means cooperating with the holding portion, the retainer, and the taps for retention of the taps on the holding portion for preventing loss of the taps from the holder during their aforesaid release for engagement with the drive socket.

4 Claims, 8 Drawing Figures

U.S. Patent Oct. 23, 1984 Sheet 1 of 2 4,478,539
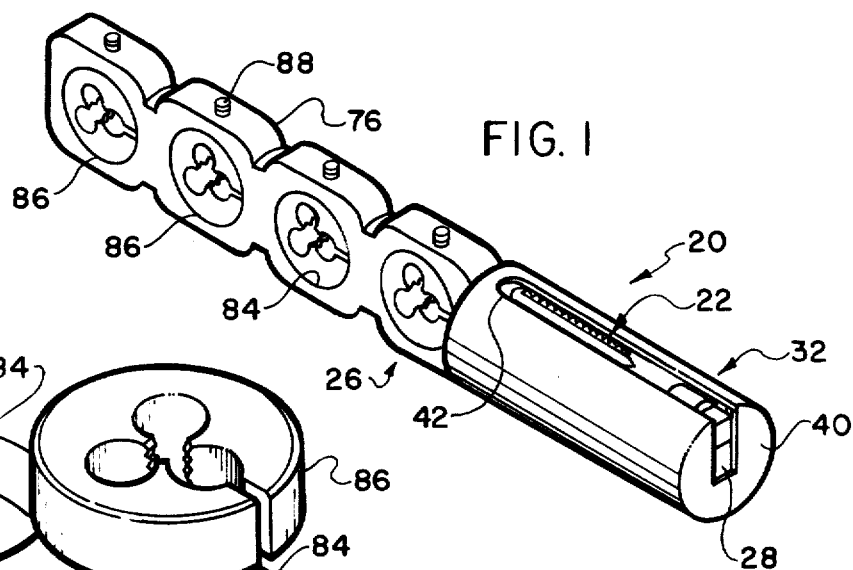
FIG. 1
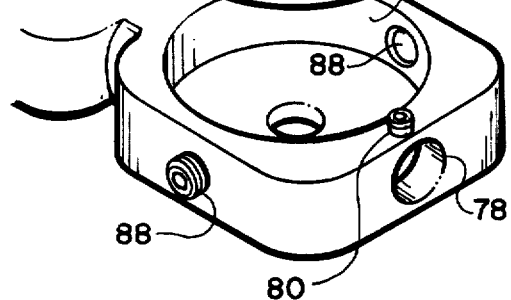
FIG. 2
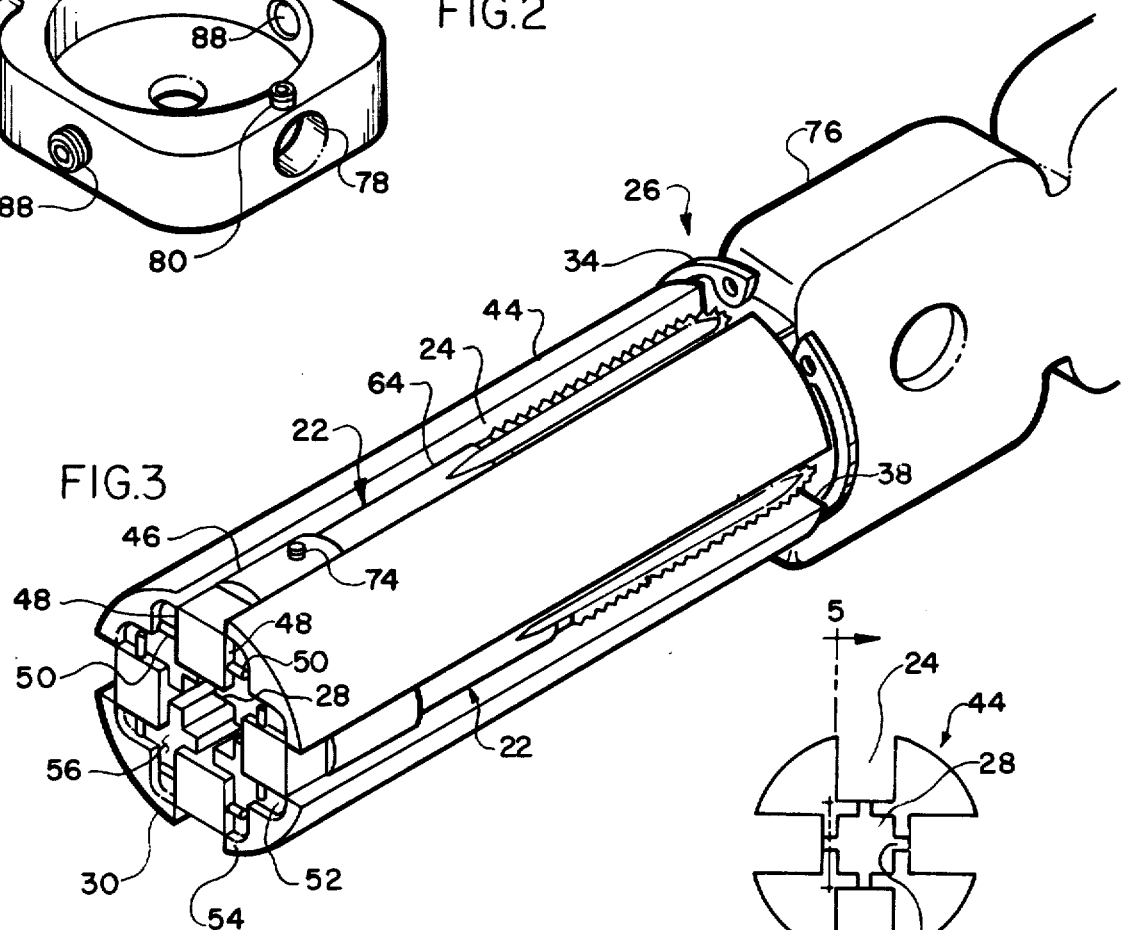
FIG. 3
FIG. 8

MULTIPLE TOOL HOLDER WITH RETAINER AND DRIVE SOCKET

BACKGROUND OF THE INVENTION

Multiple tool holders known previously fall into general classes, one in which loose tools of a standard type are stored in pockets from which they may be removed and inserted in a drive socket or other position for use with a distinct danger that the tools may be lost from the holder by carelessness, and the other uses specially constructed tools which are permanently fixed in slots in the holder for unfolding outwardly thereof in pocket-knife-blade fashion for placing the tools in using position without danger of losing them.

The present invention, however, may use standard tools which are removably secured to the multiple tool holder for selective concealment therein and for individual selective choice, exposure, and positioning of a tool into the drive socket of the holder for use while the tool remains attached to the holder without danger of loss therefrom.

U.S. Pat. Nos. 1,148,406, 1,783,346, 2,019,391, 2,337,514, 2,765,013, 2,979,742 and 3,315,295 disclose various multiple tool holders, including both the aforesaid classes.

SUMMARY OF THE INVENTION

Briefly speaking, the present invention provides a holder for elongated tools including an elongated holding portion having recesses for selective storage of the tools therein and a drive socket for selective reception of the tools thereinto for driving use of the tools, a movable retainer having means for movable securement thereof on the holding portion and being selectively movable thereon to positions for retaining the tools in the storage recesses and to other positions for release of the tools selectively for the aforesaid reception thereof into the drive socket for use of the tools, and retention means cooperating with the elongated holding portion, the retainer, and the tools for retention of the tools on the elongated holding portion for preventing loss of the tools from the holder during the release thereof into the drive socket, the retainer serving as the handle for use of the tools.

Further, the elongated tools of the invention may be taps, and the elongated holding portion may include a portion thereof having sockets for holding threading dies in fixed position for use. The movable retainer may be generally tubular and cylindrical and substantially closed at one end, with that end disposed in covering relation to one end of the elongated holding portion from which the recesses extend longitudinally of the holding portion. The drive socket is disposed in the covered end of the elongated holding portion and the retainer has a longitudinally extending slot therein for release of the tools therethrough, the slot extending into the closed end of the retainer for allowing movement of the tools into the drive socket.

Preferably, the elongated tools have drive shanks for engagement with the recesses for prevention of relative rotation therebetween about the longitudinal axes of the tools, the drive shanks having two generally parallel sides for such engagement, while the parallel sides also engage the slot in the retainer during movement of selected elongated tools into the drive socket, thereby preventing relative rotation between the tools axially thereof and the retainer. The means for retention of the elongated tools includes laterally extending means disposed on the tool shanks for capture between the elongated holding portion and the retainer, and the retainer is rotatable on the holding portion for selective exposure of each of the recesses through the slot for selectively releasing the tools or for covering all of the recesses simultaneously for retaining the tools in storage.

In the preferred embodiment of the invention, the closed end of the retainer is spaced from the end of the elongated holding portion covered thereby at an extent at least as great as the corresponding extent of the laterally extended means when located therebetween, and the retainer is secured thereat by the movable securement means. The elongated tools may be compositely constructed, each tool including a commercial standard tool bit, such as a commercial tap, having a drive shank at the end thereof opposite the working portion thereof, a tool adapter having a mating guide socket at one end for reception of the drive shank of the standard tool bit and a larger drive shank having the aforesaid parallel sides for insertion of the elongated tool into the drive socket of the elongated holding portion for use of the tool, and means for securing the shank of the tool bit into the mating guide socket of the tool adapter. The standard tool bits may include commercial taps, and the die holding portion of the elongated holding portion as well as the movable retainer may serve as a handle for use of the elongated tools.

BRIEF DESCRIPTION OF THE DRAWINGS

FIG. 1 is a perspective view of the multiple holder of the present invention showing a tap in a storage recess ready for concealment;

FIG. 2 is an enlarged exploded perspective view of the near end of the die-holding portion of the tool holder of FIG. 1, showing also a bore for reception of an attachment member of the tap-holding portion of the tool holder of FIG. 1;

FIG. 3 is an enlarged perspective view of the tool holder of FIG. 1 taken from the opposite side and having the tap or tool retainer removed;

FIG. 8 is a partial elevational view of the left end of the tool holder as shown in FIG. 3 for showing the section taken in FIG. 5.

DESCRIPTION OF THE PREFERRED EMBODIMENT

Figure 5:
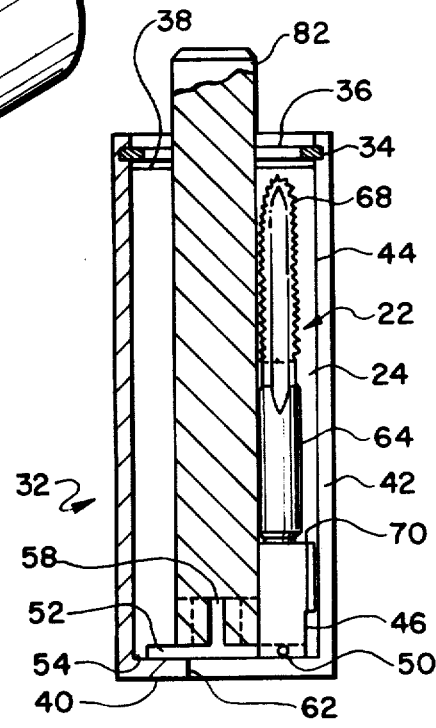
FIG. 5 is an enlarged vertical cross-sectional view (taken along the line 5—5 in FIG. 8) of the tap holding portion of the tool holder of FIG. 1, the tap having been omitted from the storage recess at the left side.

The present invention is embodied in a holder 20 for elongated tools 22 such as metal-cutting threading taps as shown best overall in FIGS. 1 and 3. Recesses 24 are provided in an elongated holding portion 26 of the holder 20 for selective storage of the tools 22 therein, and a drive socket 28 is provided in one end 30 of the holding portion 26 for selective reception of the tools 22 thereinto for driving use of the tools 22. A movable retainer 32 has a retaining ring 34 seated in an internal groove 36 at one end thereof for movable securement of the retainer 32 on the holding portion 26 as is best shown in FIG. 5. The ring 34 is located behind a shoulder 38 on the holding portion 26 for such securement.

Figure 4:
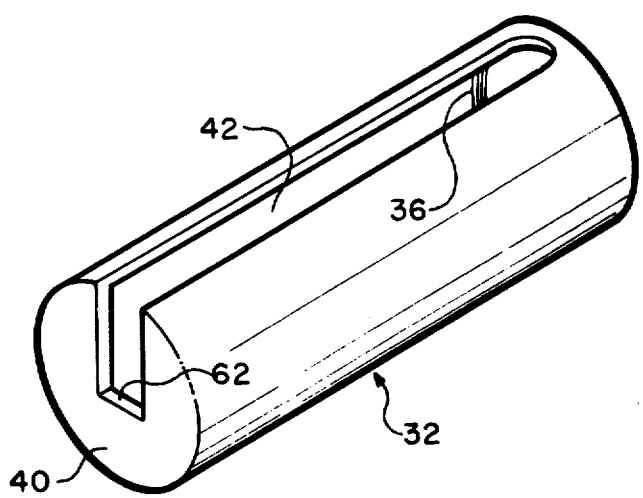
FIG. 4 is an enlarged perspective view of the tap or tool retainer of FIG. 1 taken to correspond to FIG. 3.

The retainer 32 is generally tubular and cylindrical, as best shown in FIGS. 1, 4, and 5 and has one substantially closed end 40 which is disposed in covering relation to the end 30 of the holding portion 26 wherein the drive socket 28 is located. The retainer 32 has a slot 42 extending longitudinally thereof and into the closed end 40 thereof for allowing release of the tools 22 from the recesses 24 and movement of the tools 22 into the drive socket 28. The retainer 32 is movable or rotatable on a generally cylindrical portion 44 of the holding portion 26 wherein the recesses 24 are disposed.

The slot 42 is of the same general width as the recesses 24, and the retainer 32 may be rotated for selective exposure of each of the recesses 24 through the slot 42 for releasing the tools 22 or for covering all of the recesses 24 simultaneously for retaining the tools 22 in the recesses. The tools 22 have drive shanks 46 having two generally parallel sides 48 for engagement with the sides of the recesses 24 for preventing relative rotation between the tools 22 and the recesses 24 about the longitudinal axes of the tools 22. The parallel sides 48 also engage the sides of the slot 42 during the aforesaid release and movement of the tools 22 into the drive socket 28 for preventing relative rotation between the tools 22 axially thereof and the retainer 32 thereby retaining the orientation of the tools 22 for mating insertion in the drive socket 28. The parallel sides 48 have a clearance fit with the sides of the recesses 24 and the slot 42 for ready release of the tools 22 and for the aforesaid prevention of relative rotation of the tools 22 about their axes.

Retention means in the form of laterally extending cross pins 50 are disposed on the drive shanks 46 adjacent the proximal ends thereof and extend generally perpendicularly from the sides 48. A recess 52 is provided in the end 30 of the holding portion 26 for reception of the pins 50, and when the tools 22 are assembled with the holding portion 26 as shown in FIG. 3, the retainer 32 may be assembled thereover as shown in FIGS. 1 and 5 to capture the cross pins 50 between the retainer 32 and the holding portion 26 within the recess 52. The depth of the recess 52 is at least as great as the corresponding extent or diameter of the pins 50 captured therein, and the retainer 32 is secured in the capturing position by the retaining ring 34. The rim 54 around the recess 52 might be omitted, since the pins 50 would space the resultant flat end 56 of the holding portion 26 suitably from the retainer 32 when the holding portion 26 and the retainer 32 are secured by the retaining ring 34.

An axially extending slot 58 connects each recess 24 to the drive socket 28, thereby providing clearance for the cross pins 50 upon reception of the drive shanks 46 into the drive socket 28 for driving use of the tools 22. A step 60 may be provided in each drive shank 46 to bear against the closed end 40 of the retainer 32 adjacent the end 62 of the slot 42 which is spaced beyond the central portion of the closed end 40 to be generally coextensive laterally with the drive socket 28.

Preferably, the elongated tools 22 are compositely constructed, each tool 22 comprising a commercial standard tool bit (such as a commercial standard threading tap) 64 having a reduced square drive shank 66 at the end thereof opposite the working or cutting portion 68 thereof. A tool adapter 70 is provided for each tap or tool bit 64, each adapter 70 having a mating square guide socket 72 at one end thereof for reception of the drive shank 66 and at the other end thereof the previously described cross pins 50. The adapters 70 form the previously described drive shanks 46 of the tools 22 and include the aforesaid parallel sides 48, and also include setscrews 74 for securing or locking the shanks 66 of the taps or tool bits 64 into the guide sockets 72.

The elongated holding portion 26 of the holder 20 is preferably constructed of two separate elements, one being the generally cylindrical portion 44 for reception of the elongated tools 22, and the other element being a flattened bar member 76 having a cylindrical bore 78 with a setscrew 80 thereon for attachment to a mating cylindrical projection 82 from the end of the cylindrical portion 44 adjacent the shoulder 38. The setscrew 80 serves to secure the cylindrical portion 44 to the bar member 76, so that the bar member 76 as well as the retainer 32 may serve as a handle for use of the tools 22.

As shown in FIGS. 1 and 2, the bar member 76 has sockets 84 disposed therein for receiving and holding commercial threading dies 86 in fixed position for use, setscrews 88 being provided at each socket 84 for securing the dies 86 therein.

When not in use, the holder 20 may be carried in a pocket or tool kit with the retainer 32 rotated from its position as shown in FIG. 1 to a position where the slot 42 lies between any pair of the recesses 24 for retaining all the tools 22 in their respective storage recesses 24. When the holder 20 is to be used, the retainer 32 is selectively rotated to expose any one of the recesses 24 for selective release of a tool 22 from its respective recess 24 for use thereof, normally each of the tools 22 being of a different size, form, or purpose, as are each of the threading dies 86. When the slot 42 is located above one of the recesses 24 in alignment therewith, the tool 22 within the recess 24 may then be lifted or rotated laterally of its longitudinal axis for release from the recess 24 for positioning the tool 22 for reception into the drive socket 28.

Figure 6:
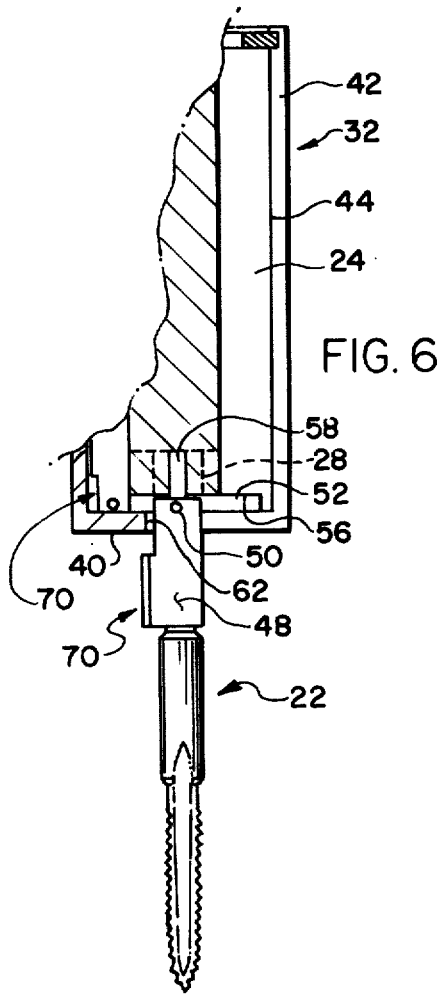
FIG. 6 is a partial cross-sectional view corresponding to FIG. 5 showing the tap of FIG. 5 moved into position ready for reception into the drive socket of the tool holder.
Figure 7:
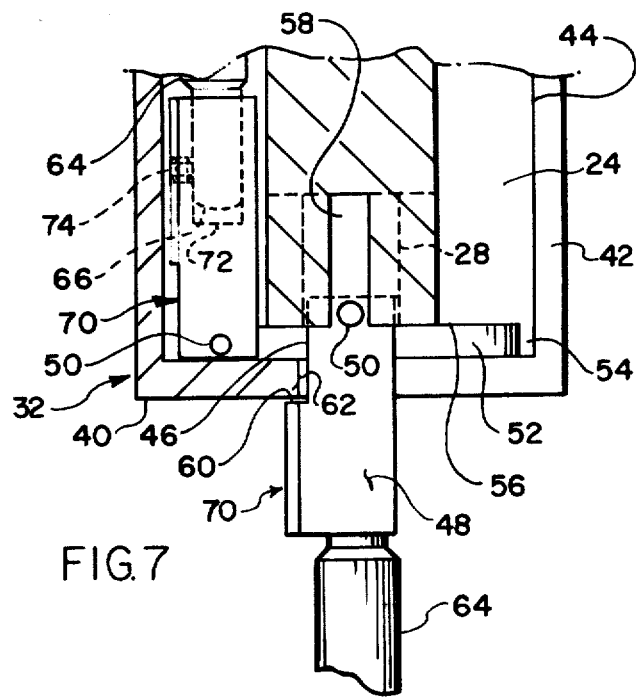
FIG. 7 is a further enlarged partial cross-sectional view corresponding to FIG. 6 showing the tap engaged in the drive socket of the tool holder.

As best shown in FIGS. 5–7, the cross pins 50 provide cooperation among the flat end 56 of the holding portion 26, the inside of the closed end 40 of the retainer 32, and the tool 22 to which they are attached for retention of the tool on the holding portion 26 while allowing the tool 22 to be rotated clockwise from its position as shown in FIG. 5 to a position rotated 180° therefrom and extending from the cylindrical portion 44 in general extension of its recess 24. The tool 22 may then be moved leftward to the position as shown in FIG. 6, the cross pin 50 sliding between the flat end 56 and the closed end 40 within the recess 52, the slot 42 still engaging the flat sides 48 of the tool 22 and preventing any rotation of the tool 22 about its longitudinal axis. The drive shank 46 of the tool 22 may then be inserted in the drive socket 28 for driving use of the tool 22, using the retainer 32 and the bar member 76 as handles for such use. The retainer 32 is restrained from turning on the tool 22 or the holding portion 26 by the continued engagement of the slot 42 with the parallel sides 48 of the tool 22.

Alternatively, the tools 22 might be specially constructed to integrally include the drive shanks 46; but this might entail a wasteful use of tool steel material in providing shanks 46 which were as large or larger than the remainder of the tools 22, since it is a practical necessity for all the drive shanks 46 to be the same size to fit the drive socket 28 and the slot 42, and some of the desired tools 22 may have relatively very small working portions as compared to other tools 22 and to the desirable shanks 46. However, since standard commercial tool bits 64 are readily and economically available with standard reduced square drive shanks 66 as shown in FIG. 7 (which normally vary in size somewhat according to the diameter of the working portions of the tool bits 64), or with other small standard shanks to which tool adapters 70 could be fitted, it is contemplated that the construction as disclosed in the drawings would be used, and the guide sockets 72 in the adapters 70 would be sized and shaped according to the particular drive shanks 66 of the tool bits 64; however, the use of ingegrally formed tools 22 would not depart from the scope of this invention as defined in the claims appended hereto. Thereby, standard tools used in the present invention could be selectively stored and released for use in the drive socket of the holder while preventing loss of the tools from the holder during their release and use, while providing a handy assortment of selected tools for interchangable selective use as needed with adequate handles for the intended use and no possibility of inadvertent separation of the handles from the tools as is common where interchangable tools have been loosely stored in handles for complete removal therefrom for use.

In other details also, the particular embodiment disclosed in full detail herein and illustrated in the drawings has been provided for disclosure purposes only and it is not intended to limit the scope of the present invention, which is to be determined by the scope of the appended claims.

I claim:

1. A holder for elongated tools comprising a set of elongated tools and laterally extending retainer means thereon, an elongated holding portion having tool storage recesses extending longitudinally from one end of said elongated holding portion for selective storage of said tools therein and a drive socket disposed in said one end of said holding portion for selective reception of said tools thereinto for driving use of said tools, a generally tubular and cylindrical retainer substantially closed at one end thereof and disposed with said closed end in covering relation to said one end of said elongated holding portion, said retainer having a longitudinally extending slot therein extending into said closed end of said retainer for allowing movement of said tools into said drive socket and having means for rotatable securement of said retainer on said holding portion and being selectively movable thereon to positions for retaining said tools in said storage recesses and to other positions for covering all of said recesses simultaneously for said retaining said tools or for selective exposure of each of said recesses through said slot for selective release through said slot of said tools individually for permitting movement thereof between said tool storage recesses and said drive socket for use of said tools, and channel means defined between said elongated holding portion and said retainer for retained movement therein of said laterally extending retainer means of said tools during said movement thereof between said tool storage recesses and said drive socket for retention of said tools on said elongated holding portion for preventing loss of said tools from said holder during said release and movement thereof between said tool storage recesses and said drive socket, said tools being compositely constructed, each tool comprising a commercial standard tool bit having a drive shank at the end thereof opposite the working portion thereof, a tool adapter having a mating guide socket at one end thereof for reception of said drive shank of said standard tool bit and a larger drive shank including two generally parallel sides for engagement with said recesses for prevention of relative rotation therebetween about the longitudinal axes of said tools and for insertion of said tool into said drive socket of said elongated holding portion for use of said tool, and means for securing said shank of said tool bit into said mating guide socket of said tool adapter, said tool bits including commercial taps and said elongated holding portion having a portion having sockets for holding threading dies in fixed position for use.

2. A holder for elongated tools according to claim 1 and characterized further in that said parallel sides of said tool shanks engage said slot during movement of selected tools into said socket for preventing relative rotation between said tools axially thereof and said retainer.

3. A holder for elongated tools according to claim 1 and characterized further in that said closed end of said retainer is disposed over said tool retaining recesses to retain said laterally extending means when located therebetween and is secured thereat by said movable securement means.

4. A holder for elongated tools according to claim 1 and characterized further in that said portion of said elongated holding portion for said dies as well as said retainer serves as a handle for use of said tools.

* * * * *